(12) United States Patent
Malik

(10) Patent No.: US 7,007,066 B1
(45) Date of Patent: Feb. 28, 2006

(54) METHOD AND APPARATUS FOR CONFIGURING ELECTRONIC MAIL ACCORDING TO A USER-SELECTED TYPE

(75) Inventor: Dale W. Malik, Dunwoody, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 09/563,930

(22) Filed: May 4, 2000

(51) Int. Cl.
*G06F 15/16* (2006.01)

(52) U.S. Cl. .................. 709/206; 709/206; 709/201; 709/219; 709/204

(58) Field of Classification Search .............. 709/206, 709/201, 219, 204
See application file for complete search history.

(56) References Cited

U.S. PATENT DOCUMENTS

| | | | |
|---|---|---|---|
| 5,375,235 A | 12/1994 | Berry et al. | 395/600 |
| 5,649,222 A | 7/1997 | Mogilevsky | 395/795 |
| 5,781,901 A * | 7/1998 | Kuzma | 707/10 |
| 5,796,948 A * | 8/1998 | Cohen | 709/206 |
| 5,819,260 A | 10/1998 | Lu et al. | 707/3 |
| 6,012,075 A | 1/2000 | Fein et al. | 707/540 |
| 6,026,410 A | 2/2000 | Allen et al. | 707/104 |
| 6,057,841 A * | 5/2000 | Thurlow et al. | 345/809 |
| 6,073,133 A | 6/2000 | Chrabaszcz | 707/10 |
| 6,199,103 B1 | 3/2001 | Sakaguchi et al. | 709/206 |
| 6,212,553 B1 * | 4/2001 | Lee et al. | 709/206 |
| 6,349,295 B1 | 2/2002 | Tedesco et al. | 707/3 |
| 6,356,937 B1 * | 3/2002 | Montville et al. | 709/206 |
| 6,377,949 B1 | 4/2002 | Gilmour | 707/10 |
| 6,405,225 B1 * | 6/2002 | Apfel et al. | 715/526 |
| 6,453,338 B1 | 9/2002 | Shiono | 709/206 |
| 6,460,074 B1 * | 10/2002 | Fishkin | 709/206 |
| 6,507,865 B1 * | 1/2003 | Hanson et al. | 709/206 |

OTHER PUBLICATIONS

Itroduction to Microsoft Outlook, 1998, Computer Services, pp. 1-30.*
Sue Mosher, Receiving and Responding to Email Messages with Outlook, Feb. 1997, Duke Press pp. 1-5.*
Sue Mosher, Receiving and Responding to E-mail Messages, Feb. 1997, Duke Press pp. 1-5.*
Sue Mosher, Sending E-Mail Messages, Feb. 1997, Duke Press pp. 1-5.*
Sue Mosher, Using the New Message Window, Feb. 1997, Duke Press pp. 1-4.*
Copy of filing receipt and U.S. Patent Application Entitled: Method and Apparatus for Generating Reminders to Transmit Electronic Mail Attachments by Parsing E-mail Message Text; Filing Date May 4, 2000; Serial No.: 09/563,927.

* cited by examiner

*Primary Examiner*—Arid Etienne
*Assistant Examiner*—Sahera Halim
(74) *Attorney, Agent, or Firm*—Thomas, Kayden, Horstemeyer & Risley, LLP

(57) ABSTRACT

The present invention is directed to a method and apparatus for reminding a user to include an e-mail attachment file with an e-mail communication. The e-mail application is configured to provide a menu of different types of e-mail for the user to select, and to provide templates that require the user to attach an attachment file when that option is selected.

21 Claims, 6 Drawing Sheets

---

What type of e-mail would like to send?

○ Message

○ Attachment

○ Message with Attachment

Figure 3

What would you like to do?

o Review received messages o Compose new e-mail o Reply to a received message

Figure 4

What type of e-mail would like to send?

o Message o Attachment o Message with Attachment

Figure 5

> To whom would you like to send your e-mail?
>
> Single Recipient
>
> o Within Network
>
> o Outside of Network
>
> Multiple Recipients
>
> o I will supply addresses
>
> o Select from Mail group

Figure 6

> What type of attachments are being sent?
>
> o Word processing documents
>
> o Spreadsheet files
>
> o Graphics files
>
> o Video/Audio files
>
> o Speech files

Figure 7

E-Mail Message

To:

From:

Re:

Message:

Figure 8

E-Mail Attachment

To:

From:

Re:

File Name and Path:

METHOD AND APPARATUS FOR CONFIGURING ELECTRONIC MAIL ACCORDING TO A USER-SELECTED TYPE

FIELD OF THE INVENTION

The present invention relates to the transmission of electronic mail over computer networks, and more particularly, to a method and apparatus for configuring the composition of electronic mail according to a type and category selected by the user from a menu of options.

DESCRIPTION OF THE RELATED ART

During the past decade, electronic mail ("e-mail") has become an indispensable tool for facilitating business and personal communications. Through computer networking systems such as local-area networks ("LAN"), wide-area networks ("WAN"), and the world-wide web ("WWW"), network users can send and receive notes, messages, letters, etc., to communicate with others who are in the same office or perhaps in remote locations across the world.

E-mail application programs are typically configured for generating messages in the form of memoranda. These programs guide a user to "compose" an e-mail message by providing a platform for entering at least one outgoing e-mail address, a "subject" heading, and a "body" for the actual message. When the user completes typing the message and presses the "send" key, the message is transmitted over the network and arrives at the provided destination address. E-mail is often used for sending relatively short messages that are only a few sentences in length.

Most e-mail application programs also allow a user to attach a file to be sent along with a message as an "attachment." In the accompanying e-mail message, the sender may introduce or explain the significance of the attachments. Attachment files might include word processing documents, graphics files, executable programs, spreadsheet reports, etc. A recipient will receive the e-mail message plus any attached files, which may then be opened and accessed through the appropriate application software. In many applications, it is preferable to send documents through e-mail attachments instead of a facsimile because the recipient can then store, edit, and print an original file. For long-distance communications, it is also less costly to send documents via e-mail as compared with a facsimile.

In order to send an attachment with most e-mail application programs, a user first composes a message in the ordinary course by specifying a destination address, a subject heading, and a message. The user then selects the "attachment" icon and selects a file that is stored in memory or on floppy disk. Upon selecting a file and selecting the "ok" icon, the user finally selects the "send" option to begin transmission of the e-mail.

There are several problems that users often encounter when sending e-mail attachment files. As an initial matter, it is possible that a user cannot understand how to utilize the e-mail application program to compose e-mail, review received e-mail, or reply to e-mail that was received. Further, it is also relatively common for a user to forget to send an attachment along with a message when composing an e-mail. In some circumstances, sending an e-mail without the intended attachments can lead to confusion, or at least embarrassment, because the user referred in the sent message to an attached file that has not been sent. These problems significantly reduce the benefits of e-mail systems and may negatively affect a user's productivity when engaging in electronic mail communications.

SUMMARY OF THE INVENTION

In view of the difficulties encountered with sending attachments to e-mail communications described above, there is a need for a method and apparatus for configuring an electronic mail communication such that the user is prompted at the appropriate time to attach a file to an e-mail if desired.

In accordance with the present invention, a user can be reminded to include an attachment file by being prompted within the e-mail application if the user selects an option from a menu of different e-mail types that includes an e-mail attachment. The user is unable to send the e-mail communication without providing an attachment file or reconfiguring the e-mail to be of a type that does not include an attachment.

The present invention also provides a method for composing an e-mail communication in a menu-driven e-mail application. The user is guided through each option for utilizing the e-mail application through a series of menus.

Accordingly, the present invention provides a method for configuring an e-mail communication. A menu of a plurality of different types of e-mail communications is displayed, wherein at least one of the types of e-mail communication is comprised of a plurality of components. A selection of a type is received through a user interface. In response, a template is provided for each component of the type selected, wherein the templates identify fields necessary for assembling the respective components of an e-mail communication.

The present invention further provides a method for configuring an e-mail communication through a menu-based user interface. A first menu of a plurality of different activities associated with an e-mail applications program is provided. A user selects an activity from the first menu through a user interface. In response to a selection from the first menu, a second menu of a plurality of different types of e-mail communications is provided, wherein at least one of the types of e-mail communication is comprised of a plurality of components. A user selects a type of e-mail communication through the user interface. A template is provided for each component of the type selected by the user from the second menu, wherein the templates identify fields necessary for the user to assemble the respective components of an e-mail communication. A series of additional menus are provided for different fields in the template, wherein each menu provides a series of options for determining the information required for each respective field.

The present invention also provides an interface for configuring e-mail communications based on a user-selected type. This includes a menu display of different types of e-mail communications, wherein at least one of the types of e-mail communication is comprised of a plurality of components, an input means for receiving a selection of a type from a user, and a processor for generating a template for each component of the type of e-mail communication selected by the user, wherein the templates identify fields necessary for the user to compose the respective components of an e-mail communication.

The present invention additionally includes an e-mail communications system for configuring e-mail communications. This includes a first data base for storing a plurality of menus, each menu providing a list of options for composing an e-mail communication. A second data base stores a plurality of templates, where each template is associated with an option and identifies fields necessary for transmission of the e-mail communication having the selected options. A user interface displays the plurality of menus from the first data base, receives selections of options, and provides the plurality of templates in response to selections of options. A network interface transmits an assembled e-mail communication when information is provided for each of the necessary fields.

The present invention also provides a method for reminding a user to include an attachment file with an e-mail communication. A menu is provided from which the user selects to assemble an e-mail communication having an attachment file. A template is provied for the user to identify an attachment file to be included in the e-mail communication. The e-mail communication is transmitted only after an attachment file is included.

BRIEF DESCRIPTION OF THE DRAWINGS

FIG. 3 is a graphical user interface of an initial menu of e-mail activities in an e-mail application program of the present invention.

FIG. 4 is a graphical user interface of a secondary menu of e-mail types in an e-mail application program of the present invention.

FIG. 5 is a graphical user interface of a template for composing an e-mail message according to the present invention.

FIG. 6. is a graphical user interface of a template for composing an e-mail attachment according to the present invention.

FIG. 7 is a graphical user interface of a menu according to the present invention.

FIG. 8 is a graphical user interface of a menu according to the present invention.

DETAILED DESCRIPTION OF THE PREFERRED EMBODIMENTS

Figure 1A:
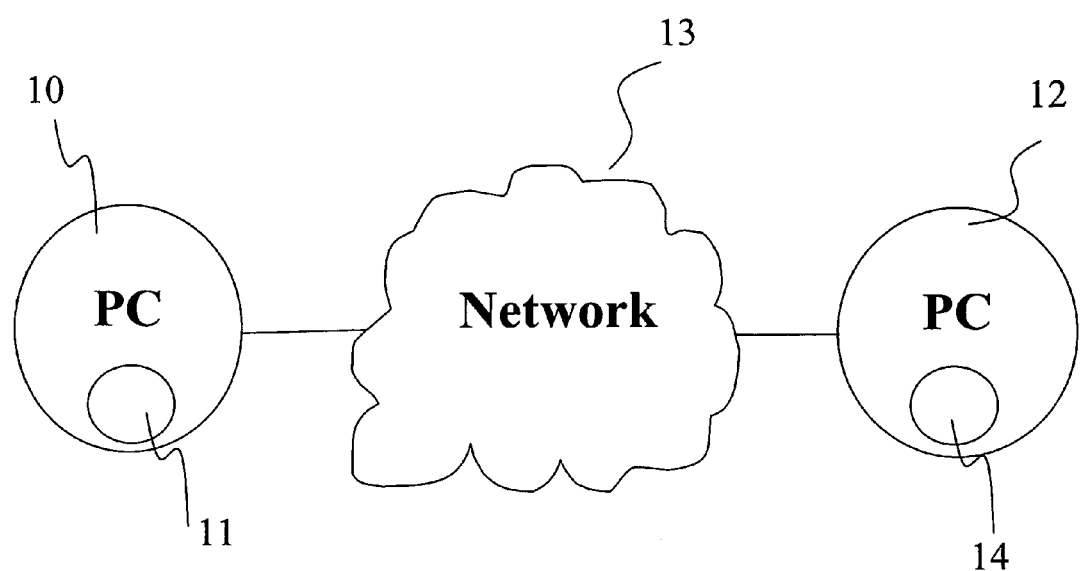
FIG. 1a is a schematic diagram of a basic computer network system in accordance with an embodiment of the present invention.

The present invention will now be described in more detail with reference to the figures. FIG. 1a is a schematic diagram of a basic computer network system in accordance with a preferred embodiment of the present invention, in which computer 10 is connected to computer 12 through a network 13 to facilitate e-mail communications with attachments. Computer 10 has an e-mail communications user interface 11 that permits the computer to send e-mail communications using network 13. Likewise, computer 12 has an e-mail communications user interface 14 that permits the computer to receive e-mail communications from network 13. The term computer in this description is not limited to any particular type of computer, and may include computer systems having many computers, or only a portion of a computer. Network 13 can be in the form of a wired network or a wireless network. The network may be a simple, single communication path, or it may include one or several LANs or WANs, the world wide web, or any combination thereof. Computers 10 and 12 may be the only computers connected to the network 13, or the network may be shared by many other computers.

The configuration of the e-mail application interface of the present invention prompts the user to first specify what type or category of e-mail communication is to be transmitted. For example, with regard to e-mail "types," a user may wish to simply send an e-mail message, or may intend to send solely an e-mail attachment file. As another type of e-mail communication, the user may wish to send an e-mail message accompanied by an attachment file. These are three different types of e-mail communications. There are also several categories associated with an e-mail communication that is to be composed. For example, the user may wish to send the e-mail to a single recipient or to a plurality of recipients. If the user chooses to attach a file, there are also several categories of attachments, such as wordprocessing files, graphics files, audio/video files, or speech files. Once the user selects the type and categories associated with the e-mail communication to be composed, an e-mail application program can then configure the e-mail communication to include all of the required fields to ensure proper transmission of a properly composed e-mail.

The user chooses the type and category associated with the e-mail communication to be composed according to a menu provided to the user. The user can then select options and features from the menu, which govern the configuration of the resulting e-mail communication. The user can opt to customize the menu to add or remove features in order to facilitate rapid composition of e-mail communications.

According to the type and categories selected by the user, the e-mail application program provides a series of templates for which the user supplies information. Transmission of the e-mail communication is suspended until the user supplies all of the information required for each selected e-mail component.

Figure 1B:
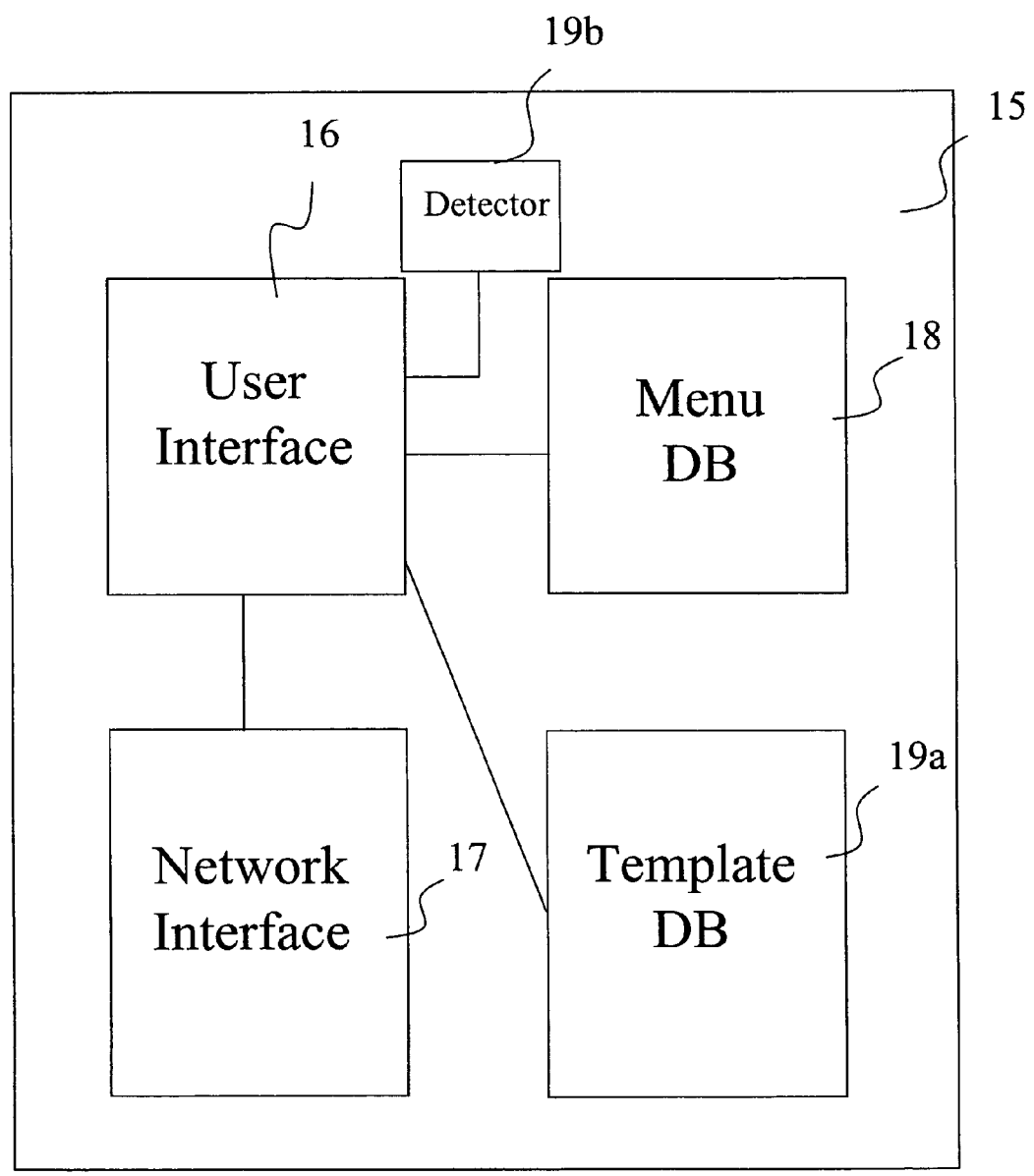
FIG. 1b is a schematic diagram of an e-mail communicatinos system in accordance with an embodiment of the present invention.

FIG. 1b illustrates a schematic of an e-mail communications system according to this embodiment. E-mail communications system 15 includes a user interface 16 providing a user display and receiving information input from the user. Attached to user interface 16 is network interface 17, which may be connected to a LAN, data line, or any other networking communications interface for transmitting and receiving e-mail communications. The user interface 16 is connected to a first database, which is a menu database 18. The menu database stores data pertaining to all menus to be provided to the user, which provide options in composing e-mail communications. The user interface is additionally attached to a second database, which is a template database 19. The template database 19 stores information necessary for providing templates, which are used for composing e-mail communications having the user-specified options from the menu database 18. A detector 19b detects whether the user has supplied information for each of the fields in the template.

Figure 2:
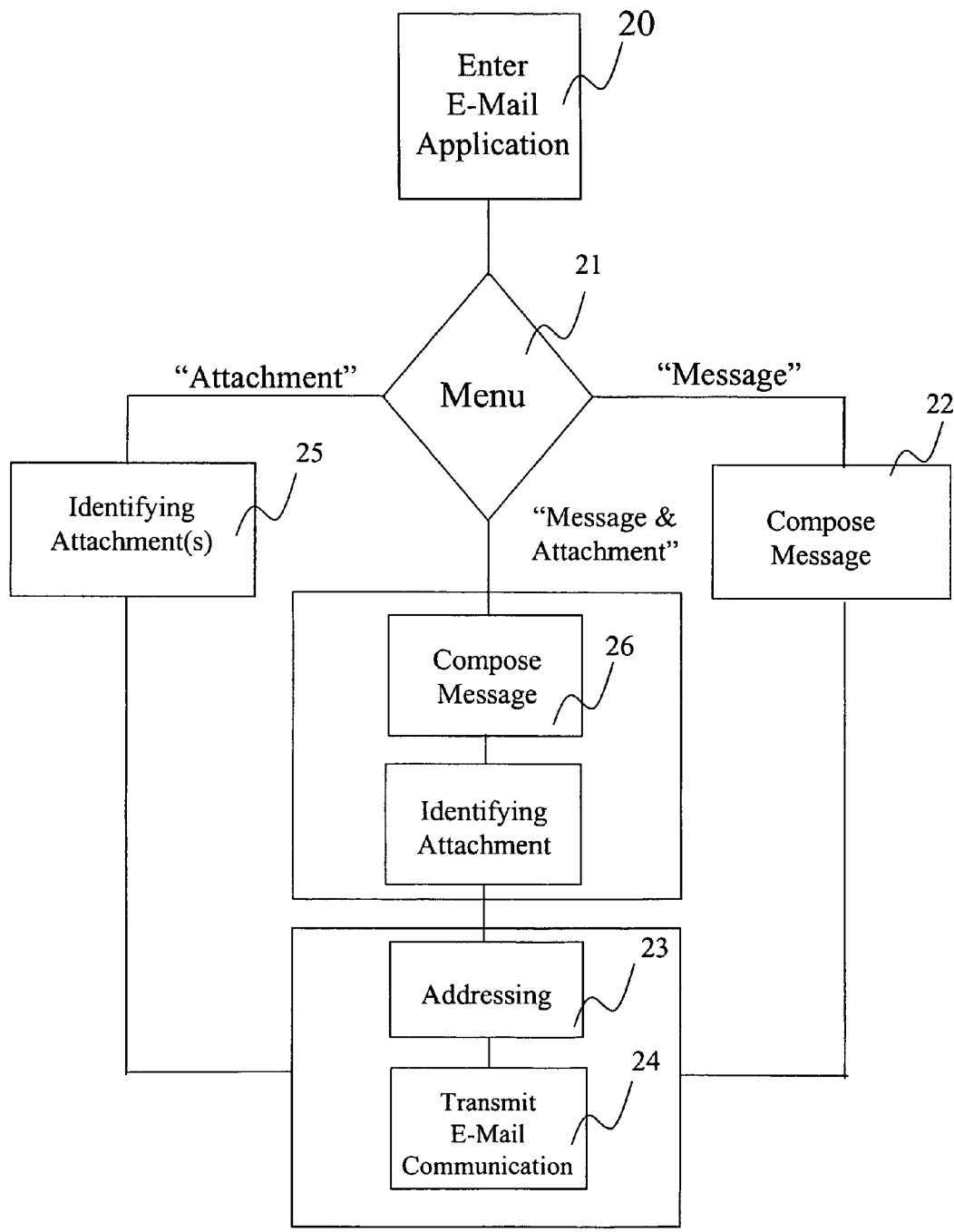
FIG. 2 is a flow diagram of an e-mail menu configuration embodiment of the present invention.

FIG. 2 illustrates the operation of the e-mail configuration application according to this embodiment. Upon the selection of the e-mail communication application 20, the system first prompts the user to select from a menu the type of e-mail communication that is to be transmitted, as in step 21. Once the user chooses from the menu of e-mail communication categories, the system configures the e-mail communication to facilitate composition of each requisite portion of the desired e-mail communication.

If the user chooses to simply send an e-mail message, then the system provides a template for composing a message, as in step 22. Once the user completes the message and indicates that the message is finished, the user enters the destination address information, as in step 23, and the message is then sent, according to step 24. Likewise, if the user chooses to simply send an attachment file, the system requires the user to identify one or more files to be sent as an e-mail communication, as in step 25. Once the user finishes identifying all attachments that are to be sent, the system then prompts the user to enter the destination address information and then sends the attachments, as in steps 23 and 24, respectively. In this embodiment, the system will not transmit an e-mail message or an attachment until it detects that the user supplied all of the necessary components of a message or an attachment, respectively.

If the user's menu selection indicates that the desired transmission is an e-mail message and an e-mail attachment, the system provides templates to the user for both components of the e-mail communication, as in step 26. The system does not transmit the e-mail communication until both the requisite components of an e-mail message and at least one attachment file are provided.

The system described in this embodiment is configured to transmit e-mail communications along the network illustrated in FIG. 1. E-mail communications interface 11 within computer 10 can incorporate the above-described features to provide prompts and templates for composition of e-mail messages, e-mail attachments, or other combinations e-mail communications. Once the e-mail communication described with respect to FIG. 2 is "sent," as in step 24, the e-mail communication is propagated along network 13 to computer 12.

FIGS. 3–7 show examples of graphical user interface (GUI) screen displays, which may be used according to the invention to begin configuration of an e-mail communication. Of course, these may be displayed on a monitor for a computer terminal, workstation, etc. The GUI in FIG. 3 provides an example of an initial menu for the user to choose how to utilize the e-mail application program. The user can choose between "review received message," "Compose new e-mail," or "Reply to received message." This system is not limited to these three delineated activities, but may additionally include other activities associated with electronic mail communications, such as editing a pre-composed message.

If the user chooses to "Compose a new e-mail," a new menu is displayed, for example, as the menu shown in FIG. 4. The user is provided with a menu of three different types of e-mail communications to send. If the user chooses to send a "Message," the GUI as shown in FIG. 5 next appears on the screen. This GUI provides a template for composing an e-mail message. By selecting the field labelled "To" in the template, another screen appears that requires the user to define a recipient or a group of recipients, as shown in FIG. 7. If the user elects to send an e-mail to a group of recipients, transmission of the e-mail is suspended until at least two recipients are identified.

If the user chooses to compose an attachment, a template is displayed as in FIG. 6. The template provides all of the fields required for composing an e-mail attachment. As described above, the user first supplies destination addresses according to the GUI in FIG. 7. The system then provides a GUI to assist in identifying the file to be attached, as in FIG. 8. This GUI allows the user to specify what category of files are to be attached. The system can then provide more screens to assist the user in locating the files to be attached.

If the user elects to send a "Message with attachment," the template for configuring an attachment is presented once the template for a message is completed. Therefore, the user will not forget to attach the intended files along with the composed e-mail message.

Thus, it is readily seen that the method and system of the present invention provides for improved e-mail communications when e-mail attachments are to be transmitted from the user's computer to another. The system detects when the user intends to send an e-mail attachment, and reminds the user to configure an e-mail attachment prior to the transmission of the e-mail communication.

The foregoing disclosure of embodiments of the present invention and specific examples illustrating the present invention have been present for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. A method for configuring an e-mail communication, comprising the steps of:
    (a) displaying a menu of a plurality of different types of e-mail communications, wherein at least one type of e-mail communication is comprised of a plurality of components;
    and wherein a user is prompted and forced to select a type before being allowed to compose an email communication;
    (b) receiving a selection of a type; and
    (c) providing a template for each component of the selected type, wherein the templates identify fields necessary for a user to assemble the respective components of the e-mail communication.

2. The method for configuring an e-mail communication according to claim 1, wherein the types of e-mail communications include the set of an e-mail message, an e-mail attachment, and a combination of an e-mail message and an e-mail attachment.

3. The method for configuring an e-mail communication according to claim 1, further comprising the step of transmitting the e-mail communication of the selected type after information is received for each of the necessary fields in each provided template.

4. The method for configuring an e-mail communication according to claim 1, wherein at least one of the provided templates displays at least one menu of a plurality of options for at least one of the fields in the template.

5. The method for configuring an e-mail communication according to claim 4, wherein one provided template includes a field for identifying at least one destination e-mail address, and a menu displays options for identifying the at least one destination e-mail address.

6. The method for configuring an e-mail communication according to claim 5, further comprising the steps of:
    receiving, in response to the menu in the provided template a selection to include a plurality of destination e-mail addresses;
    generating a first prompt to identify destination e-mail addresses; and
    generating a second prompt if a plurality of destination e-mail addresses are not received.

7. A method for configuring an e-mail communication through a menu-based user interface, comprising the steps of:
(a) providing a first menu of a plurality of different activities associated with an e-mail applications program;
(b) receiving a selection from the first menu of an activity through a user;
(c) in response to the selection from the first menu, providing a second menu of a plurality of different types of e-mail communications, wherein at least one of the types of e-mail communications is comprised of a plurality of components;
(d) prompting and forcing a user to select a type of email communication before allowing the user to compose an e-mail communication;
(e) receiving a selection from the second menu of a type through the user interface;
(f) providing a template for each component of the type selected by the user from the second menu, wherein the templates identify fields necessary for the user to assemble the respective components of an e-mail communication; and
(g) providing a series of additional menus for different fields in the template, wherein each menu provides a series of options for determining the information required for each respective field.

8. The method of configuring an e-mail communication according to claim 7, wherein the activities for an e-mail application include the set of preparing an e-mail communication, reviewing a received e-mail communication, and replying to a received e-mail communication.

9. The method for configuring an e-mail communication according to claim 7, wherein the types of an e-mail communication include the set of an e-mail message, an e-mail attachment, and a combination of an e-mail message and an e-mail attachment.

10. The method for configuring an e-mail communication according to claim 9, wherein the e-mail communication is transmitted only after the user provides information for each of the necessary fields in each template provided to the user.

11. An interface for configuring e-mail communications based on a user-selected type, comprising:
(a) a menu display of different types of e-mail communications, wherein at least one type of e-mail communication is comprised of a plurality of components;
(b) an input means for receiving a selection of a type, wherein entry of the user-selected type is mandatory before the user is allowed to compose an email communication; and
(c) a processor for generating a template for each component of the type of e-mail communication selected by the user, wherein the templates identify fields necessary for the user to assemble the respective components of an e-mail communication.

12. The interface for configuring e-mail communications according to claim 11, wherein the types of an e-mail communication include the set of an e-mail message, an e-mail attachment, and a combination of an e-mail message and an e-mail attachment.

13. The interface for configuring e-mail communications according to claim 12, wherein the e-mail communication is transmitted only after the user provides information for each of the necessary fields in each template provided to the user.

14. An e-mail communication system for configuring e-mail communications, comprising:
(a) a first data base for storing a plurality of menus, wherein each menu provides a list of options for composing an e-mail communication;
(b) a second data base for storing a plurality of templates, wherein each template is associated with an option and identifies fields necessary for transmission of the e-mail communication having the selected options;
(c) a user interface for displaying the plurality of menus from the first data base, for prompting and forcing a user to select a menu from the first data base before the user is allowed to compose an e-mail communication, for receiving selections of options, and for providing the plurality of templates in response to selections of options; and
(d) a network interface for transmitting an assembled e-mail communication when information is provided for each of the necessary fields.

15. The e-mail communications system according to claim 14, further comprising a detector for detecting whether information is identified for each field of each template provided.

16. The e-mail communications system according to claim 14, wherein the options to be selected include choosing between composition of an e-mail message, an e-mail message with at least one attachment, and an e-mail attachment.

17. A method for reminding a user to include an attachment file with an e-mail communication, comprising the steps of:
(a) prompting and forcing a user to select from a menu of a plurality of different types of e-mail communications, wherein at least one type of e-mail communication is comprised of an e-mail communication having an attachment file;
(b) receiving a selection of the e-mail communication having an attachment file;
(c) providing a template for the user to identify an attachment file to be included in the e-mail communication;
(d) transmitting the e-mail communication only after an attachment file is included.

18. The method for reminding a user to include an attachment file according to claim 17, further including the step of detecting whether the user identified information for each field provided in the template.

19. A computer readable medium for storing instructions for performing a method for configuring an email communication comprising:
logic configured to display a menu or a plurality of different types of email communications wherein at least one type of email communication is comprised of a plurality of components, and wherein a user is prompted and forced to select a type before being allowed to compose an email communication;
logic configured to receive a selection of a type; and
logic configured to provide a template for each component of the selected type, wherein the templates identify fields necessary for a user to assemble the respective components of the email communication.

20. The computer readable medium of claim 19, wherein the types of e-mail communications include the set of an e-mail message, an e-mail attachment, and a combination of an e-mail message and an e-mail attachment.

21. The computer readable medium of claim 19, further comprising;
 logic configured to provide at least one template which includes a field for identifying at least one destination email address;
 logic configured to provide a menu to display options for identifying the at least one destination email address;
 logic configured to receive, in response to the menu in the provided template, a selection to include a plurality of destination email addresses; and
 logic configured to generate a prompt to identify destination email addresses.

* * * * *